Jan. 28, 1969 J. A. McDONALD ET AL 3,424,941
TRANSISTOR DEFLECTION CIRCUIT WITH CLAMPER MEANS
Filed Feb. 7, 1966
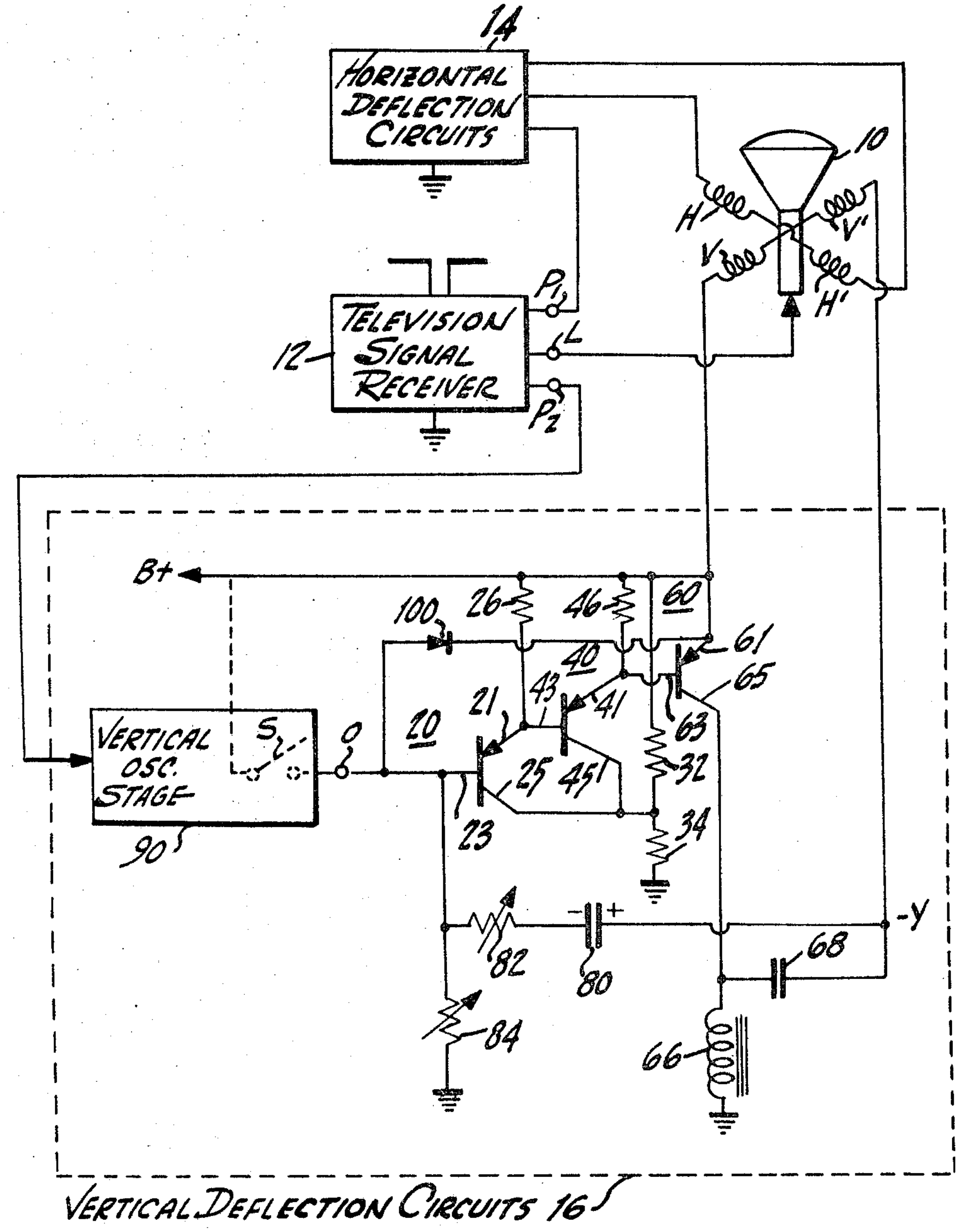
INVENTORS
JOHN B. BECK AND
JAMES A. McDONALD
BY
Eugene M. Whitacre
Attorney United States Patent Office 3,424,941

Patented Jan. 28, 1969

3,424,941

TRANSISTOR DEFLECTION CIRCUIT WITH CLAMPER MEANS

James A. McDonald and John Brewer Beck, Indianapolis, Ind., assignors to Radio Corporation of America, a corporation of Delaware Filed Feb. 7, 1966, Ser. No. 525,601

U.S. Cl. 315—27 6 Claims

Int. Cl. H01j 29/76

ABSTRACT OF THE DISCLOSURE

A Miller integrator circuit suitable for application to television vertical deflection is provided at its input with a clamping circuit for limiting voltage excursions whereby a tendency to oscillate at one-half field rate is precluded.

This invention relates generally to transistor deflection circuits, and particularly to arrangements for precluding spurious modes of operation in such circuits.

In a co-pending patent application of John B. Beck and Roland N. Rhodes, entitled, "Transistor Deflection Circuits," Ser. No. 455,736, filed May 14, 1965, the application of the principles of the "Miller Integrator" to transistor deflection circuits is discussed in detail, and resultant deflection circuits of an advantageous character for serving the vertical deflection function in a television receiver are disclosed. In such circuits, the vertical deflection winding of the receiver is traversed by a desired current waveform in response to the generation of a sawtooth voltage waveform across a capacitor, the capacitor being coupled in a negative feedback path associated with a high current gain transistor amplifier. The capacitor is subject to alternate charging and discharging in an operating cycle recurring at the television field rate (e.g. 60 c.p.s.).

A tendency of the above-described deflection arrangements to "jitter" (sustain oscillations) at a 30 cycle per second rate (i.e. one-half the field rate) is overcome in accordance with the present invention through the use of circuitry functioning to insure the initiation of conduction in the above-mentioned amplifier at a substantially fixed recurrence rate and thereby insure proper generation of a sawtooth waveform having a substantially stable peak amplitude. In a particular embodiment of the invention, means are provided to limit voltage excursions of a given polarity at an appropriate point in the above-mentioned negative feedback path to accomplish the desired result.

A primary object of the present invention therefore is to provide a novel and improved transistor vertical deflection circuit.

A further object of the present invention is to provide a transistor vertical deflection circuit including apparatus for precluding spurious modes of circuit operation.

The novel features that are considered characteristic of this invention are set forth with particularity in the appended claims. The invention itself, however, both as to its organization and method of operation as well as additional objects thereof, will best be understood from the following description when read in connection with the accompanying drawing which illustrates in schematic form a television receiver including a vertical deflection circuit embodying the principles of the present invention.

In the drawing, the bulk of the circuits of a television receiver serving to provide signals for energizing an image reproducing device such as a kinescope 10 are represented by a single block 12 labelled, "Television Signal Receiver." The receiver unit 12 incorporates the usual elements requisite to provide video signals (at output terminal L) for appropriate intensity modulation of the electron beam of kinescope 10, as well as to provide suitable synchronizing pulse information (at output terminals $P_1$ and $P_2$) to synchronize, in respective horizontal and vertical deflection circuits 14 and 16, the energization of the respective windings (H, H', and V, V') of the deflection yoke associated with kinescope 10.

In the vertical deflection arrangement shown in the drawing, a sawtooth current waveform is caused to pass through the vertical deflection windings V and V' of the deflection yoke, the windings V and V' being connected in series between a source of uni-directional voltage (B+) and a yoke input terminal Y. The flow of the desired sawtooth current waveform in the windings, which appear essentially resistive at the television field frequency, is produced in response to the development of a sawtooth voltage waveform at terminal Y. The development of this sawtooth voltage waveform is effected through use of a transistorized arrangement employing the principles of the "Miller Integrator."

Transistors 20, 40, and 60 are cascaded to form a high current gain amplifier. Negative feedback is established between the amplifier output and the amplifier input via a path incorporating a capacitor 80. Capacitor 80 is subject to alternate charging and discharging by switching action of a synchronized vertical oscillator stage 90.

Considering the circuit arrangement and operation in greater detail, vertical oscillator stage 90, illustrated schematically as a switch, is operated on a recurrent basis to alternately connect the oscillator stage output terminal O to the source of B+ voltage and then to disconnect the terminal O from such source. While the oscillator stage 90 may comprise a self-contained arrangement such as the familiar blocking oscillator, a preferable arrangement involves establishment of astable multivibrator action between stage 90 and the output yoke driving stage 60 in the manner described in the aforementioned Beck and Rhodes application.

The oscillator stage output terminal O is connected to the base electrode 23 of transistor 20. Transistor 20 is arranged in an emitter follower configuration, its emitter electrode 21 being connected via an emitter resistor 26 to the B+ terminal. Transistor 40, a second emitter follower stage, includes a base electrode 43 directly connected to emitter electrode 21 and an emitter electrode 41 connected via an emitter resistor 46 to the B+ terminal. The collector electrodes 25 and 45 of the two emitter follower stages 20 and 40 are jointly connected to the junction of resistors 32 and 34, resistors 32 and 34 providing a low impedance voltage divider between B+ and ground.

The output of the cascaded emitter follower stages 20 and 40 is applied to the base electrode 63 of output transistor 60, base 63 being directly connected to emitter 41. The emitter 61 of transistor 60 is coupled to the B+ terminal. A direct current conductive path between collector electrode 65 and ground is provided through a high A.C. impedance choke 66. An alternating current signal path is also provided between collector 65 and emitter 61, this path comprising a D.C. blocking capacitor 68 in series with the vertical yoke winding V, V'. The afore-mentioned yoke input terminal Y appears at the junction of blocking capacitor 68 and the yoke winding V'.

Feedback between terminal Y and the base electrode 23 of transistor 20 is provided via a path comprising capacitor 80 in series with a variable resistor 82. A variable resistor 84 is connected between base electrode 23 and ground.

The nature of the feedback provided via capacitor 80 and resistor 82 is negative since emitter follower stages 20 and 40 produce no signal phase shift while the stage 60 provides a phase reversal.

In accordance with the present invention a clamping diode 100 is connected between the base electrode 23 of transistor 20 and an appropriate voltage point such as is provided at emitter electrode 61 of transistor 60.

The operation of the vertical deflection circuit shown in the drawing now will be considered in greater detail. When switch S is open (e.g. a transistor maintained in its nonconductive state), transistors 20, 40, and 60 are biased for conduction. A charging circuit for capacitor 80 is established between the B+ terminal and ground, the charging circuit comprising the series combination of resistor 84, resistor 82, capacitor 80, blocking capacitor 68 and the conducting output transistor 60. Resistor 84, selected with a resistance value substantially greater than the resistance value of resistor 82, is primarily determinative of the capacitor charging rate. The negative feedback action provided between the terminals Y and O tends to oppose changes in the voltage at terminal O during the charging period. The voltage across resistor 84 therefore remains substantially constant and the current through resistor 84 also remains substantially constant. The relatively constant charging current thus applied to capacitor 80 assures a high degree of linearity for the sawtooth voltage produced across capacitor 80. The charging time constant is effectively larger than that indicated by the physical values of capacitor 80 and resistor 84 since the dynamic action of the amplifier stages 20, 40, and 60 multiplies the effective capacitance by a factor related to the amplifier gain.

When switch S is closed (e.g. a transistor is driven to saturation conduction), transistor 60 is driven to cut off and a discharging circuit for capacitor 80 is completed comprising, in series, the closed switch S, resistor 82, capacitor 80 and the yoke winding V, V'. Resistor 82 is primarily determinative of the discharging rate and as noted above, with resistor 82 substantially smaller than resistor 84, the discharging time constant of capacitor 80 is much shorter than the charging time constant.

From the foregoing brief description, it can be seen that the effect of periodic opening and closing of switch S is to develop across capacitor 80 (i.e. at terminal Y with respect to ground) a substantially linear sawtooth voltage waveform during trace resulting in a desired sawtooth current waveform flowing through the effectively resistive yoke windings V, V'.

As indicated by the arrows associated with resistors 82 and 84, these components may be made variable. Variable resistor 84 which controls capacitor charging during the vertical trace interval conveniently can serve as a height control while variable resistor 82 which controls capacitor discharging during the vertical retrace interval conveniently may serve as a linearity control.

In a practical self-sustaining vertical deflection circuit the switch S may be replaced in the manner described in the above-mentioned Rhodes and Beck application by a transistor stage coupled in the fashion of an astable multivibrator to the amplifier stages 20, 40, and 60. Synchronization of the multivibrator type action for insuring a properly phased display then may be effected by means of the application of vertical sync pulses from terminal $P_2$ to the vertical oscillator stage 90.

With the foregoing general description of the operation of the vertical deflection circuit in mind, a spurious mode of operation, the consequences of which are avoided by means of the present invention, now will be considered.

The above-described form of deflection circuit may have a tendency to sustain an auxiliary oscillation rate at a rate of 30 cycles per second as well as to sustain oscillations at the desired 60 cycle per second field rate. The occurrence of this spurious auxiliary 30 cycle per second oscillation may be attributed to the fact that, in the absence of circuit means constructed in accordance with the present invention, the duration of the interval during which output stage 60 is turned off is dependent upon the peak amplitude of the retrace pulse developed at terminal Y with the latter in turn being dependent upon the maximum sawtooth amplitude produced during the previous trace interval. For example, if the sawtooth amplitude is lower than normal at the end of a given trace interval, the next succeeding retrace pulse will be smaller in magnitude than normal. Since the discharging rate (i.e. the R-C time constant) associated with capacitor 80 remains substantially constant, the smaller retrace voltage pulse will not discharge capacitor 80 to the desired level during the retrace interval before vertical oscillator stage 90 is turned off by multivibrator action. The amplifier stages 20, 40, and 60 will therefore initially be biased for greater than normal current such that by the end of the next trace interval, the sawtooth will reach a peak value greater than normal. The next succeeding retrace pulse will then be greater, and in succession the period during which output stage 60 is conductive will be shorter, and the sawtooth waveform will reach a lower peak value. Such an alternation between low and high peak current sawtooth waveforms will continue producing an oscillation at a 30 cycle per second rate and therefore produce a "jitter" of the vertical amplitude of the display.

In accordance with the present invention, such "jitter" is precluded by means of the clamp circuit comprising the diode 100.

Near the end of the retrace portion of each cycle, as oscillator stage 90 is turned off, the voltage at point O tends to swing more positive than B+, the extent of the positive swing being dependent upon the peak value of the negative voltage pulse produced at point Y during that retrace portion of the cycle. If, as was mentioned above, the negative retrace voltage pulse is greater than normal, the voltage at point O near the end of retrace would tend to swing substantially above B+. Diode 100 then conducts, limiting the positive excursion of the voltage at point O. Then, when oscillator stage 90 is cut off and capacitor 80 commences charging through resistor 84, resistor 82, capacitor 68 and output stage 60, the voltage at point O decreases in a substantially fixed interval to the value less than B+ required to turn on stages 20, 40, and 60. The desired linearly increasing trace waveform then commences at the desired time.

The point to which diode 100 is returned is selected according to the turn on characteristics of the stages 20, 40, and 60.

What is claimed is:

1. In a television receiver having a cathode ray image reproducing tube, vertical deflection windings for said tube, and a source of vertical synchronizing signals, a vertical deflection circuit comprising in combination:

switching means subject to periodic switching between a conductive and a non-conductive state;

an amplifier having an input terminal and an output terminal, said amplifier comprising a transistor having an emitter electrode connected to an uni-directional voltage source, and having a collector electrode coupled to said output terminal;

means for coupling said switching means between said amplifier input terminal and said uni-directional voltage source;

means including a capacitor for establishing a negative feedback path between said output and input terminals;

means including a resistor coupled between said amplifier input terminal and a first reference voltage terminal;

and voltage clamping means coupled between a point in said feedback path and a second reference voltage terminal for precluding voltage excursions of a given polarity at said amplifier input terminal beyond a predetermined level.

2. In a television receiver, a vertical deflection circuit according to claim 1 wherein said last-named means comprises clamping means coupled between said amplifier input terminal and said second reference voltage terminal for precluding voltage excursions at said input terminal substantially beyond the voltage established at said second reference voltage terminal.

3. In a television receiver, a vertical deflection circuit according to claim 2 wherein said vertical deflection windings are coupled to said output terminal and said clamping means is arranged to preclude voltage excursions in such a sense as to reverse bias said amplifier beyond a predetermined level.

4. In a television receiver, a vertical deflection circuit according to claim 3 wherein said clamping means comprises a diode poled to conduct excess charge from said capacitor at the end of retrace to minimize the effect of variations in vertical retrace pulse amplitude on said amplifier and thereby minimize oscillations in vertical image size.

5. In a television receiver, a vertical deflection circuit according to claim 4 wherein said second reference voltage terminal is coupled to said uni-directional voltage source.

6. In a television receiver, a vertical deflection circuit according to claim 4 wherein said second reference voltage terminal is connected to said emitter electrode of said transistor.

References Cited

UNITED STATES PATENTS

| | | | |
|---|---|---|---|
| 3,229,151 | 1/1966 | Attwood | 315—27 |

RODNEY D. BENNETT, *Primary Examiner.*

J. G. BAXTER, *Assistant Examiner.*